(12) United States Patent
Maile et al.

(10) Patent No.: US 10,716,309 B2
(45) Date of Patent: Jul. 21, 2020

(54) FILLING MACHINE AND METHOD FOR FILLING A PASTY MASS, IN PARTICULAR FOR THE PRODUCTION OF SAUSAGES

(71) Applicant: ALBERT HANDTMANN MASCHINENFABRIK GMBH & CO. KG, Biberach (DE)

(72) Inventors: Bernd Maile, Oggelshausen (DE); Martin Staudenrausch, Biberach (DE)

(73) Assignee: ALBERT HANDTMANN MASCHINENFABRIK GMBH & CO. KG, Biberach (DE)

(*) Notice: Subject to any disclaimer, the term of this patent is extended or adjusted under 35 U.S.C. 154(b) by 903 days.

(21) Appl. No.: 15/213,446

(22) Filed: Jul. 19, 2016

(65) Prior Publication Data

US 2017/0035068 A1    Feb. 9, 2017

(30) Foreign Application Priority Data

Aug. 5, 2015    (EP) .................................. 15179775

(51) Int. Cl.
| | | |
|---|---|---|
| A22C 11/00 | (2006.01) | |
| A22C 11/08 | (2006.01) | |
| A22C 11/02 | (2006.01) | |

(52) U.S. Cl.
CPC .......... A22C 11/08 (2013.01); A22C 11/0209 (2013.01); A22C 11/0245 (2013.01)

(58) Field of Classification Search
CPC ....... A22C 11/00; A22C 11/001; A22C 11/08; A22C 11/0209
USPC ........... 452/21–26, 30–32, 35–37, 46–48, 51
See application file for complete search history.

(56) References Cited

U.S. PATENT DOCUMENTS

| | | | | |
|---|---|---|---|---|
| 4,484,374 | A * | 11/1984 | Herschberger ......... | A22C 11/08 452/41 |
| 6,685,549 | B2 * | 2/2004 | Henry .................... | A22C 11/00 452/30 |
| 6,688,959 | B2 * | 2/2004 | Kasai ................... | A22C 11/107 452/30 |
| 7,179,161 | B2 * | 2/2007 | Hergott .................. | A22C 11/02 452/46 |
| 7,467,993 | B2 * | 12/2008 | Whittlesey ......... | A22C 11/0209 452/37 |

(Continued)

FOREIGN PATENT DOCUMENTS

| | | |
|---|---|---|
| DE | 44 17 906 A1 | 11/1995 |
| DE | 10233468 A1 | 2/2004 |

(Continued)

OTHER PUBLICATIONS

European search report for application No. 15179775.0, dated Feb. 8, 2016.

(Continued)

*Primary Examiner* — Richard T Price, Jr.
(74) *Attorney, Agent, or Firm* — Marshall, Gerstein & Borun LLP

(57) ABSTRACT

A filling machine and a method for filling a pasty mass, in particular for the production of sausages, with a delivery pump for conveying the pasty mass with a first drive, and a dosing pump that is coupled to an outlet of the delivery pump and a transmission train via which the dosing pump is coupled to a second drive integrated into the filling machine housing.

13 Claims, 6 Drawing Sheets

(56) References Cited

U.S. PATENT DOCUMENTS

| | | | |
|---|---|---|---|
| 8,371,909 B2* | 2/2013 | Lowder | A22C 11/00 452/32 |
| 8,827,774 B2* | 9/2014 | Bilowski | A22C 11/008 452/35 |
| 8,944,895 B2* | 2/2015 | Maile | A22C 11/0245 452/31 |
| 2012/0295526 A1 | 11/2012 | Staudenrausch | |

FOREIGN PATENT DOCUMENTS

| | | |
|---|---|---|
| EP | 1829451 A1 | 9/2007 |
| EP | 2377405 A1 | 10/2011 |

OTHER PUBLICATIONS

Chinese Office Action for Application No. 201610633874.X, dated Mar. 28, 2018.

\* cited by examiner

FILLING MACHINE AND METHOD FOR FILLING A PASTY MASS, IN PARTICULAR FOR THE PRODUCTION OF SAUSAGES

CROSS-REFERENCE TO RELATED APPLICATION

The present application claims priority to European Application No. 15 179 775.0, filed Aug. 5, 2015. The priority application, EP 15 179 775.0 is hereby incorporated by reference.

FIELD OF THE DISCLOSURE

The disclosure relates to a filling machine for filling pasty masses and a filling method, in particular for the production of sausages according to the preambles of claims 1 and 9.

BACKGROUND

Filling machines for filling pasty masses, in particular for filling sausage casings, are already known from prior art. Filling machines generally comprise a hopper into which a pasty mass is filled, and from which the pasty mass is via a delivery pump conveyed, for example, into a stuffing tube, from where the pasty mass is then ejected into a sausage casing. Individual portions are produced with appropriate filling machines and their weight should preferably be very accurate. The weight accuracy of a filling machine, in particular a vacuum filling machine, depends on numerous factors. They include inter alia the variances of the variables specific to the environment, the input product, the output product, machines and processes. In particular the ambient and product temperatures, the viscosity of the mass to be filled, the stuffing tube diameter, the pump geometry, the filling speed etc. are of significance.

The aforementioned systematic influences can be compensated at least in part by appropriate countermeasures. Correcting portion weight fluctuations is in practice usually effected by readjustment of the portion weight or volume that is set at the pump of the filling machine.

However, so-called random errors additionally occur in practice. They are much more difficult to control or correct and therefore contribute significantly to unsatisfactory weight accuracy of the filled portions over a prolonged period of time. They include primarily uncontrollable flow processes within the pump due to pressure fluctuations in the outlet region of the rotary vane pump. In rotary vane pumps, the pasty mass, which is by the ambient air pressure pressed from the hopper into the conveying mechanism, is in the vane chamber conveyed toward the outlet, where the volume of the vane chambers decreases towards the outlet such that the pasty mass is compressed and the pressure in the pressure region increases toward the outlet. It is thereby possible that a pressure equalization flow, due to pressure differences between the pressure and the suction region, occurs from the pressure region of the rotary vane pump to the suction region, whereby weight inaccuracies arise (see e.g. also FIG. 6 in which the pressure region is denoted by 32 and the suction region by 31). Pressure equalization flows between individual chambers due to small gaps can also occur.

The main problem of the portion weight compensation method lies in the fact that this is a reactive iteration method, i.e. the achievable portion weight accuracy is often unsatisfactory due to constantly drifting actual values—at the same time requiring increased adjustment work.

In order to obtain increased portion accuracy, solutions have already been attempted in which two dosing pumps are disposed one behind the other, i.e. that actually two vacuum filling machines must be provided, one of which comprises a hopper. However, this leads to a number of drawbacks, such as e.g.—high cost,—increased number of wearing parts,—poor cost-efficiency,—increased likelihood of failure,—increased cleaning effort,—increased space requirement,—increased energy consumption,—reduced flexibility because the system is bulky and can not be retooled in a short period of time.

SUMMARY OF THE DISCLOSURE

Proceeding from there, one aspect of the present disclosure is to provide an improved filling machine and an improved method for filling a pasty mass, in particular for the production of sausages, which ensure high portion accuracy and avoid the drawbacks mentioned above.

According to the present disclosure, the filling machine now comprises a delivery pump for conveying the pasty mass with a first drive and a dosing pump coupled to an outlet, i.e., an outlet end of the delivery pump, and a drive train via which the dosing pump unit is coupled to a second drive integrated into the filling machine, in particular into the filling machine housing. This means that the dosing pump is without its own drive coupled to the filling machine, whereby the dosing pump is small and manageable so that the filling machine can also in a short period of time and in a simple manner be retooled, which leads to a large degree of flexibility. Since the dosing pump is designed without its own drive and can be driven by a drive in the filling machine that is already present for other functions, i.e. e.g. in the housing of the filling machine, investment costs can be reduced significantly and a respective dosing pump can also be easily retrofitted in existing assemblies. The dosing pump is therefore arranged at a distance from the drive.

According to a preferred embodiment, the filling machine comprises a device for detecting whether a dosing pump is coupled and/or is to be driven by the second drive. Such device can be, for example, a sensor which responds when the dosing pump is coupled, whereby actuation of the dosing pump can be activated, and/or an input device via which the operator can enter that a dosing pump is coupled and/or is to be driven. The device can also comprise a product memory in which respective process data for different types of products to be produced is stored, where it is also stored whether a dosing pump is to be driven by the second drive. This information can then be retrieved by the controller.

An existing drive can thereby be used in a simple manner for the dosing pump. The filling machine advantageously comprises a machine controller which controls the first and the second drive. Due to the fact that both drives are controlled by the machine controller, the functions and operating parameters of the two drives can be optimally coordinated.

The second drive is a drive integrated into the filling machine, i.e. presently in the machine housing, and can be controlled by the machine controller for the use of other auxiliary devices, in particular for at least one of the following auxiliary devices: inline grinder, twist-off unit, length measuring unit, clipper etc.

When a dosing pump is coupled, the function for actuating the dosing pump can be selected in the machine controller. Costs can be further saved by using an already existing drive, making the machine even more cost-efficient. The second drive can alternatively be used for the dosing pump or for a different auxiliary device via an appropriate transmission. One drive can therefore be installed in the factory which can then be used as needed for different auxiliary devices, which substantially simplifies the production and lowers production cost.

Both the delivery pump as well as the dosing pump is advantageously configured as a rotary vane conveying unit, where the size of the dosing pump is smaller than the size of the rotary vane pump. This means that the volume that can be delivered by the dosing pump for every revolution (of 360°) is substantially smaller than the respective volume of the delivery pump. For example, the volume of the delivery pump for every revolution, which is referred to as the swallowing capacity, can be in a range from 1200-2000 cm$^3$ and the swallowing capacity of the dosing pump in a range from 35-40 cm$^3$. The swallowing capacity of the dosing pump is therefore at approx. 1-30% of the swallowing capacity of the delivery pump, in particular 1.5-20%. Due to the fact that the size, i.e. presently the dimensions of the dosing pump are smaller than the dimensions of the rotary vane pump, the dosing pump can be managed easily and is inexpensive to manufacture. The dosing pump requires only small space and can therefore be easily integrated into the existing line system. Due to the fact that the vane chambers are much smaller than those of the delivery pump, very high weight accuracy can be obtained. The sizing of the dosing pump is in the volume range as small as possible to obtain the best weight accuracy, but as large as necessary so that the required pumping capacity can be obtained and the fillings (e.g. pieces of meat) that may be present in the mass can be conveyed easily and gently.

The dosing pump is advantageously configured such that the number of vane chambers and/or the volume of the vane chambers is variable, where preferably a rotor and/or the pump vanes are arranged to be replaceable and/or spacer elements can be employed that reduce the volume of the vane chambers.

The dosing pump can therefore be quickly and easily adapted to the respective requirements without needing to be replaced. The chamber size of the conveying mechanism can be altered by changing the number of vanes such that a changed number of vane chambers arise. The pump volume and consequently the capacity can be adapted with the spacer elements. The size of the vane chambers can also be adapted to the maximum size of the pieces of the product filling. For example, a spacer ring can be mounted on the rotor outer diameter and/or at the pump base and/or at the pump cover, etc. After removal of this spacer element or ring, the pump chamber increases in size. In connection with larger vane chambers, one thereby obtains a larger dosing pump with a correspondingly higher pumping capacity.

The dosing pump is configured as a replaceable component which on its inlet side and outlet side comprises connection regions via which it is at its inlet side connected to the outlet end of the delivery pump and at the outlet side with accessories and/or an auxiliary device, in particular with a stuffing tube or an inline grinder or a twist-off line etc. This means that the pump can be easily integrated into existing assemblies, since the connection of the dosing pump is compatible to the outlet of the filling machine and the outlet of the dosing pump is identical to the outlet of the filling machine. Accessories and auxiliary devices of the filling machine thereby also fit on the dosing pump. Quick and easy docking arises without involving any additional costs for the filling machine. Due to the connection regions, i.e. presently due to the standardized interfaces, the dosing pump therefore fits to all standard filling machines.

The drives can be actuated such that a difference $|\Delta p|$ between a first pressure $p_1$ upstream of the dosing pump and pressure $p_2$ downstream of the dosing pump is preferably in a range of $|\Delta p|=0$ to 5 bar.

According to a preferred embodiment, a first pressure sensor is provided in the conveying direction upstream of the dosing pump and a second pressure sensor in the conveying direction downstream of the dosing pump. The pressure sensors are advantageously formed in the connection regions of the dosing pump. It is also possible that the first pressure sensor is arranged in the conveying direction upstream of the outlet end of the delivery pump. The measured values taken are preferably passed to the machine controller, where the control device actuates the drives such that the pressure difference $|\Delta p|$ between the pressures measured by the first and the second pressure sensors is preferably in a range from 0 to 5 bar.

If the pressure sensors are integrated into the dosing pump, then the dosing pump is used as a measuring cell.

It is therefore possible that the smallest possible pressure difference between the inlet ($p_1$) and the outlet pressure ($p_2$) prevails at the dosing pump to prevent uncontrollable volume flows between the inlet and the outlet sides. The smaller the pressure difference $\Delta p$ is at the dosing pump, the higher the achievable portion weight accuracy. The dosing pump is preferably operated at an (adjustable) constant feed pressure $p_1$.

In the method for filling pasty mass according to the disclosure, pasty mass is delivered via a delivery pump by a first drive to a dosing pump which is driven via a transmission train of a second drive integrated into the filling machine, in particular into the filling machine housing.

It is there first by a device detected whether a dosing pump is coupled or not, where, when it is detected that a dosing pump is installed, a machine controller actuates the second drive for the use of the dosing pump, and if it is detected that no dosing pump is installed, the second drive can be actuated for the use of other auxiliary devices. An existing drive of the filling machine can therefore be used for the dosing pump without any additional expensive drive needing to be installed. This additionally brings about the advantage that a filling machine with a second drive can be manufactured in the factory and can then be used for various purposes and for various auxiliary devices depending on demand and customer requirements. Only one type of assembly must for this be manufactured in the factory, so that considerable costs can be saved and the manufacturing process can be simplified. The information to the controller as to which auxiliary device is to be driven by the second drive can also be manually entered at the input unit, or can be stored in a product memory for the different kinds of products to be produced and be retrieved by the controller.

Pressure $p_1$ is preferably measured in the conveying direction upstream of the dosing pump and pressure $p_2$ downstream of the dosing pump. The pressure gauge for measuring $P_1$ upstream to the dosing pump must not necessarily be integrated in the dosing pump module, but can also be measured in the filling machine upstream of the outlet end. Pressure $p_1$ can there preferably be set or regulated to a constant value.

The drive of the delivery pump and of the dosing pump can be effected such that preferably $|p_1-p_2|=\Delta p=0$ to 5 bar. This preferred defined range can either be entered into the controller or it arises from the respective actuation of the pumps.

According to a preferred embodiment, the volume and/or the number of the vane chambers of the dosing pump can be altered in particular in dependence of at least one of the following parameters: the weight of the individual portion to be produced, the nominal capacity of the dosing pump, the size of the pieces of the product filling, the viscosity, etc., Pressure $p_1$ is preferably controlled at the outlet of the delivery pump by a control device. Also the volume delivered by the delivery pump per unit time or a proportional value to be controlled can alternatively be regulated, where, for example, position control is performed Preferably, the aforementioned pressure control is performed for the conveying mechanism.

Pressure $p_2$ downstream of the outlet of the dosing pump can also be regulated with a respective control device or the volume delivered by the dosing volume per unit time or a proportional value is regulated, in particular, position control is performed.

Preferably, the volume per unit time or a proportional value is controlled for the dosing pump or position control is performed, respectively.

According to the disclosure, the dosing pump is now arranged outside the filling machine housings and the second drive within the filling machine housing, where a coupling, for example, a claw coupling, is arranged on the filling machine housing for coupling the transmission train to the second drive. A respective dosing pump with a transmission train can therefore be installed or retrofitted very easily and quickly.

In the device and the method the two drives are preferable driven such that the following applies: $|p_0-p_1|>|p_1-p_2|$, where $p_0$ is the pressure on the suction side of the delivery pump (2), $p_1$ is the pressure at the outlet of the delivery pump upstream of the dosing pump, and pressure $p_2$ is the pressure at the outlet of the dosing pump. This leads to particularly good weight accuracy.

BRIEF DESCRIPTION OF THE DRAWINGS

The present disclosure shall be explained below in more detail with reference to the following figures.

DETAILED DESCRIPTION

Figure 1:
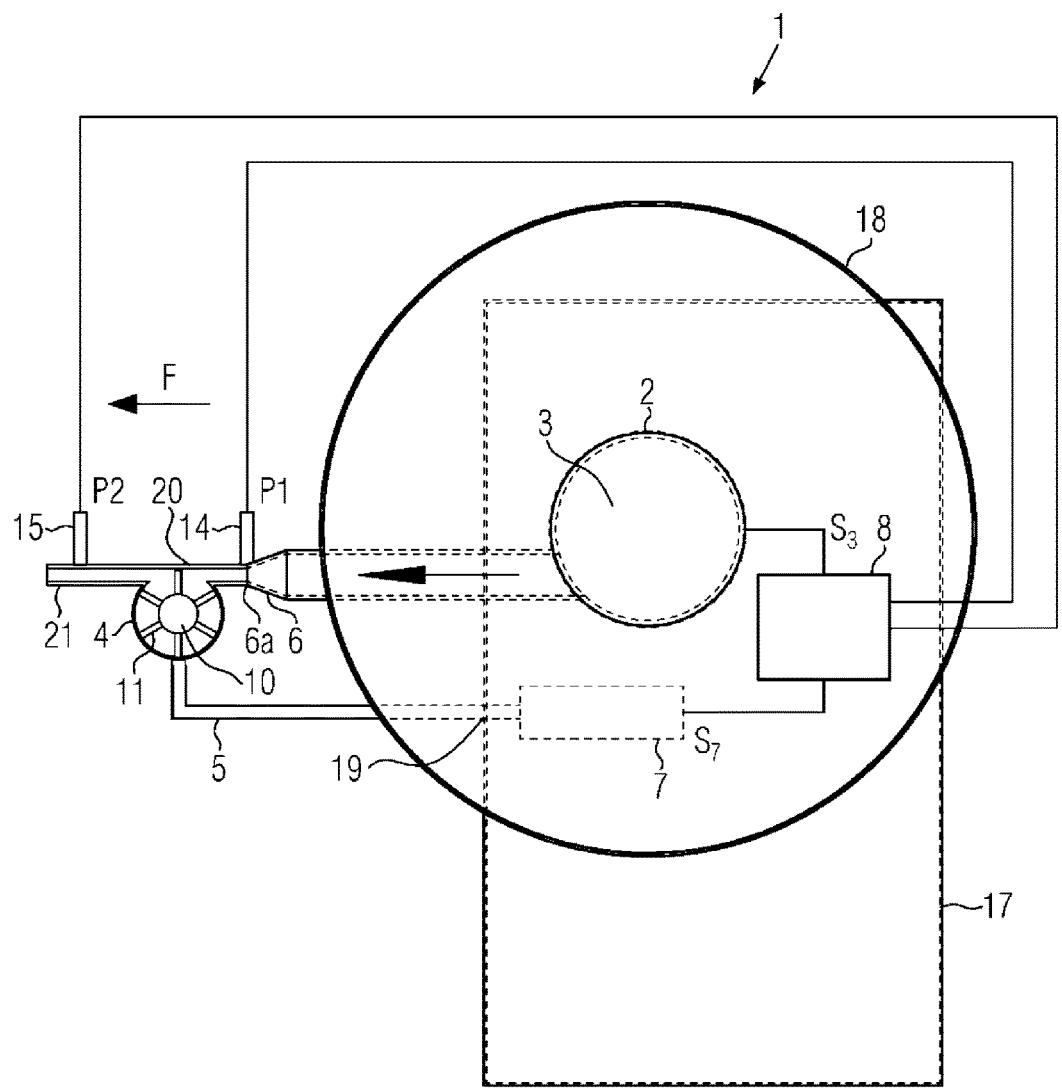
FIG. 1 very schematically shows a partially expanded top view of a filling machine according to the present disclosure.
Figure 4:
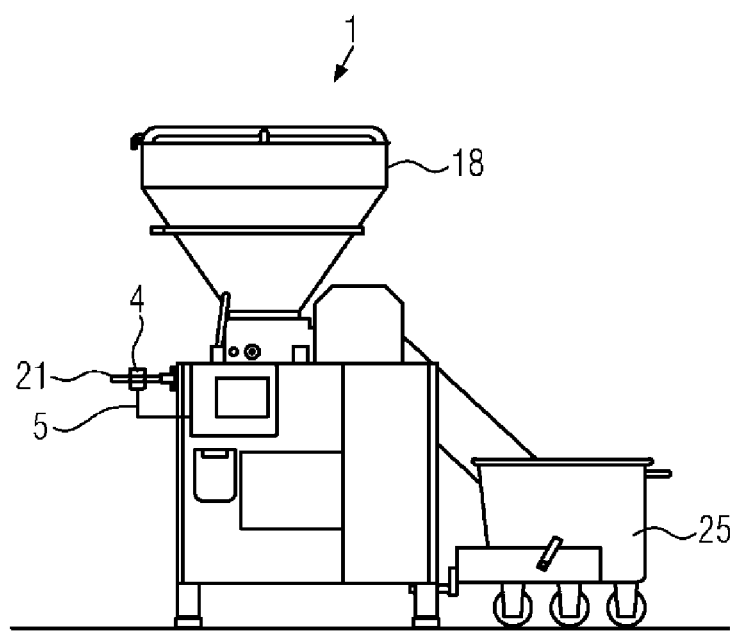
FIG. 4 schematically shows a side view of a filling machine according to the disclosure.

FIGS. 4 and 1 show a filling machine according to the present disclosure. A filling machine 1, in particular a vacuum filling machine, comprises a hopper 18 into which a pasty mass is filled, for example, by way of lifting carriage 25. The pasty mass is from the lower region of the hopper conveyed via a delivery pump 2, in particular a rotary vane pump, which shall be described in more detail below, to an outlet 6 of the filling machine, where a dosing pump 4 is coupled to outlet end 6a such that the pasty mass is transported onward from dosing pump 4 in the conveying direction F.

Delivery pump 2 is advantageously a rotary vane pump with integrated drive 3, i.e. a drive motor.

Figure 5:
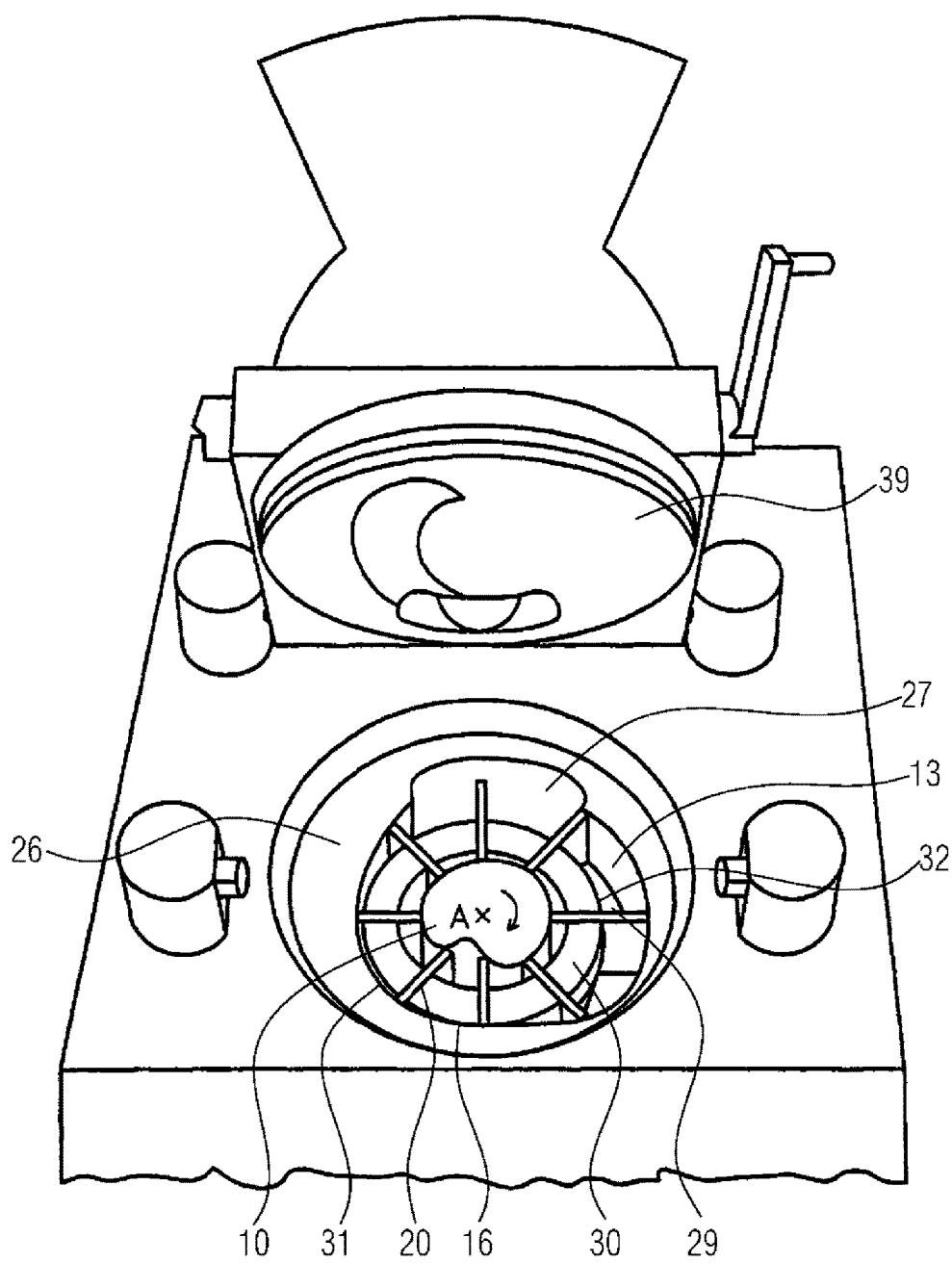
FIG. 5 shows a perspective view of a delivery pump according to the disclosure.
Figure 6:
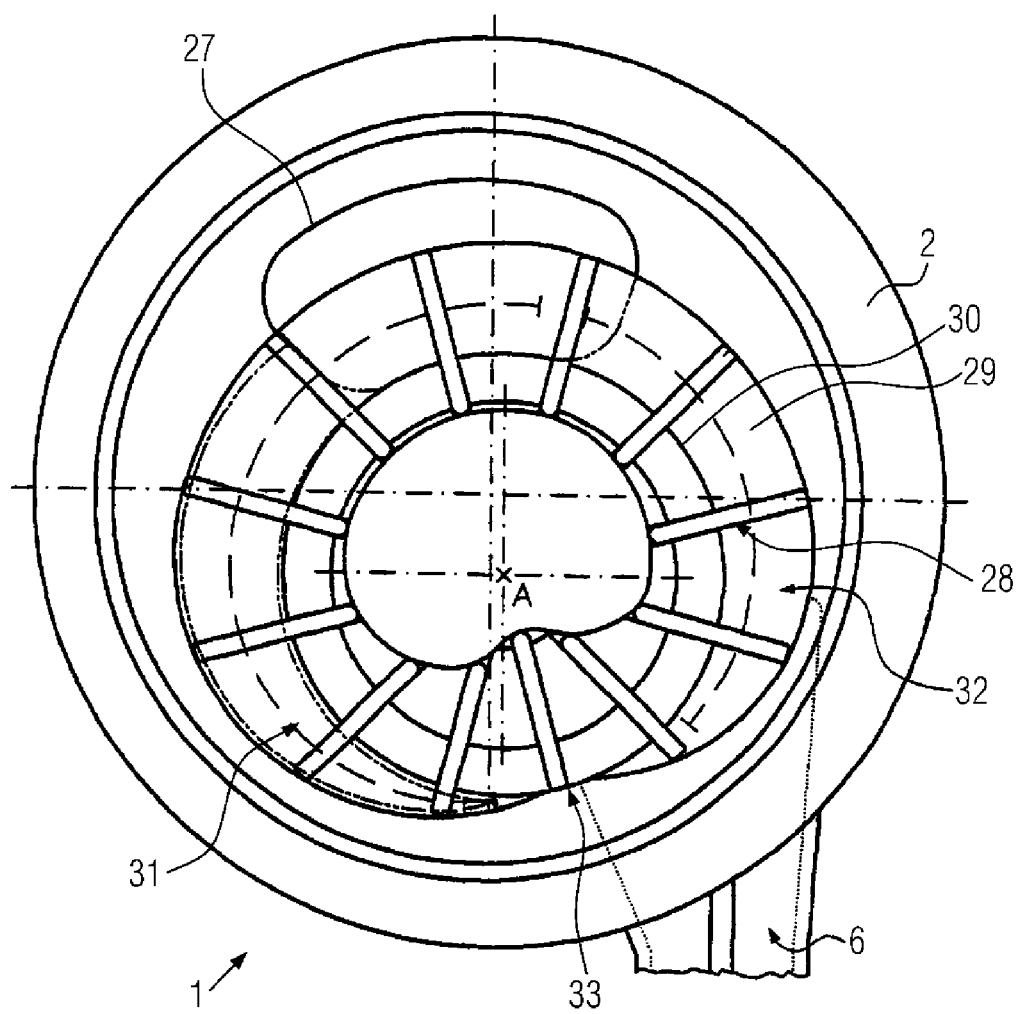
FIG. 6 schematically shows a top view of a conveying mechanism with the cover removed.

FIGS. 5 and 6 show a respective rotary vane pump 2 comprising a housing 26 and a pivotable cover 39, as well as an inlet 27 and an outlet 6 for the pasty mass. Inlet 27 is connected, for example, to the outlet of hopper 18 via which the pasty mass is fed to rotary vane pump 2. Inlet 27 is normally, for example, at outlet end 6a connected to a stuffing tube, presently not shown. Above-mentioned dosing pump 4 is there connected in place of the stuffing tube, where connection region 20 of dosing pump 4 is compatible to outlet end 6a of delivery pump 2. Delivery pump 2 comprises, for example, in pump housing (26) a preferably eccentrically disposed rotor 30 that can be set into rotation and is by first drive 3 driven via a pump shaft about axis A. Rotor 30 comprises radially displaceably mounted vanes 28 which with the inner wall, the base, and the cover of housing 26 form vane chambers or conveying cells, respectively. Rotor 30 is mounted e.g. eccentrically around a stationary clamping eccentric 10. By rotating the rotor or the vanes, respectively, pasty mass can in a known manner be conveyed in the conveying cells or vane chambers 29, respectively, from the inlet to the outlet. The rotary vane pump can be generally divided into several regions. One of these regions is suction region 31, another is pressure region 32, where a sealing region 33 separates pressure region 32 from suction region 31. Pressure region 32 begins in the rotational direction downstream of inlet 27 and extends up to outlet 6. Downstream of pressure region 32, which in the rotational direction of the rotor ends after outlet 6, sealing region 33 follows separating the pressure region from the suction region. Suction region 31 begins, e.g. at a point at which the gap-like spacing between the rotor and the inner wall of the pump housing increases such that the vane chambers again increase in size. Suction region 31 extends to the end of inlet 27. Pressures, e.g. from 0.005 to 1 bar prevail in the suction region. A vacuum opening can be formed in suction region 31 e.g. in the housing wall and be connected via a suction line to a vacuum pump. This region can be evacuated therewith. Pressure $p_1$ at outlet region 6, i.e., upstream of dosing pump 4, is for example 20 to 40 bar. The size of the vane chambers varies depending on the position of the chamber and is, for example, in a size range from 10 to 50 cm³. As already explained, dosing pump 4 is at end 6a of the outlet coupled via the connection region.

Dosing pump 4 is a dosing pump without an integrated drive and is designed as a portable dosing pump module that can be integrated in a simple manner.

Figure 3:
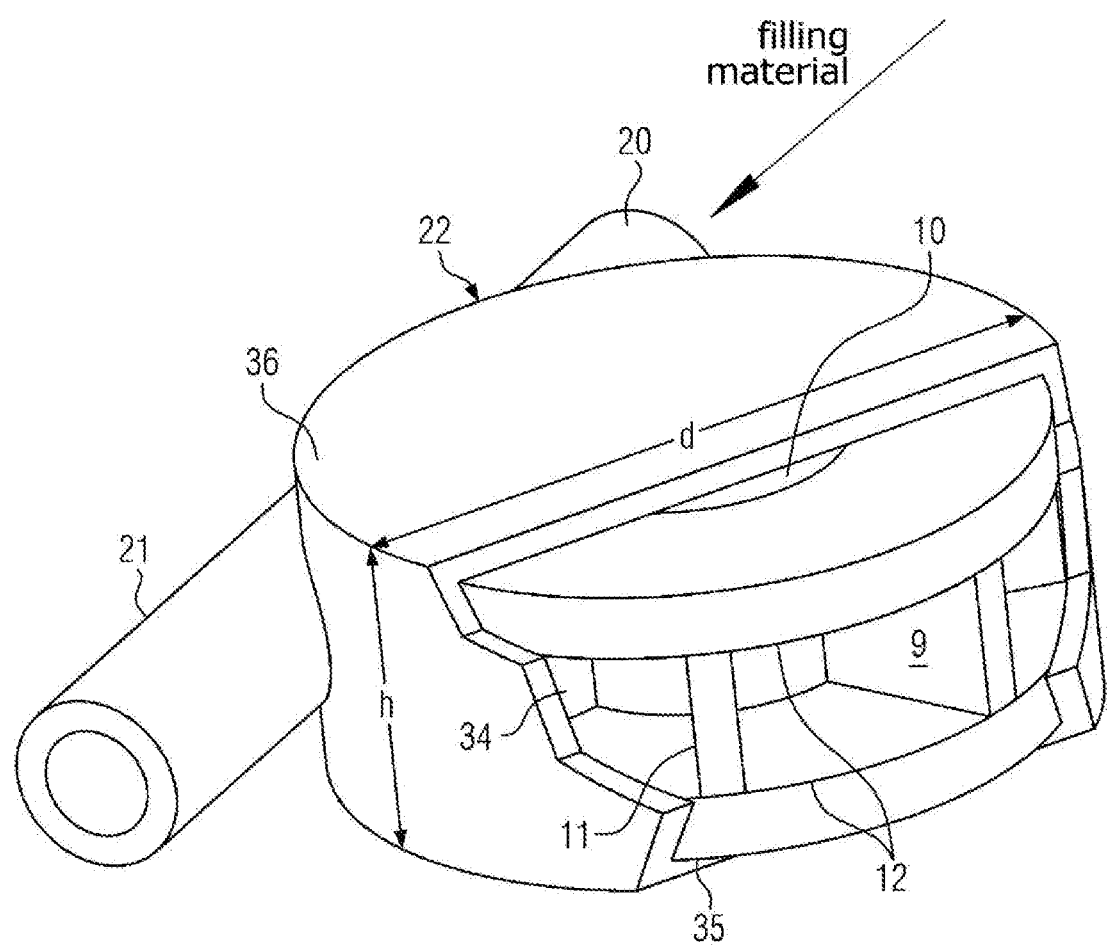
FIG. 3 schematically shows a partially expanded perspective view of one embodiment of a dosing pump.

FIG. 3 shows a partially expanded dosing pump 4 in perspective view. The dosing pump is also designed as a rotary vane conveying unit and comprises a housing 22 and two connection regions 20, 21, presently e.g. in the form of hose tails. Rotatable rotor 10 is, as also described in connection with delivery pump 2, arranged in closed pump housing 22 in which several pump vanes 11 are mounted such that vanes 11 together with wall 34 of pump housing 22, base 35 of the housing, as well as the top side of housing 36, which can also be formed as an upwardly pivotable cover, form vanes 9. In the embodiment shown in FIG. 3, spacer elements 12, i.e., presently spacer rings, are arranged such that vanes 11 with wall 34 of the rotor inner surface and spacer rings 12 form vane chambers 9. For changing the pump volume and thereby the capacity, of the maximum size of the pieces of the product filling to be processed, etc., spacer elements such a spacer ring can be provided on the rotor outer diameter and/or at the pump base and/or at the pump cover etc. After removal of the spacer elements or a respective spacer ring, the pump chamber, i.e. the volume of the vane chambers 9 again increases in size.

Figure 2:
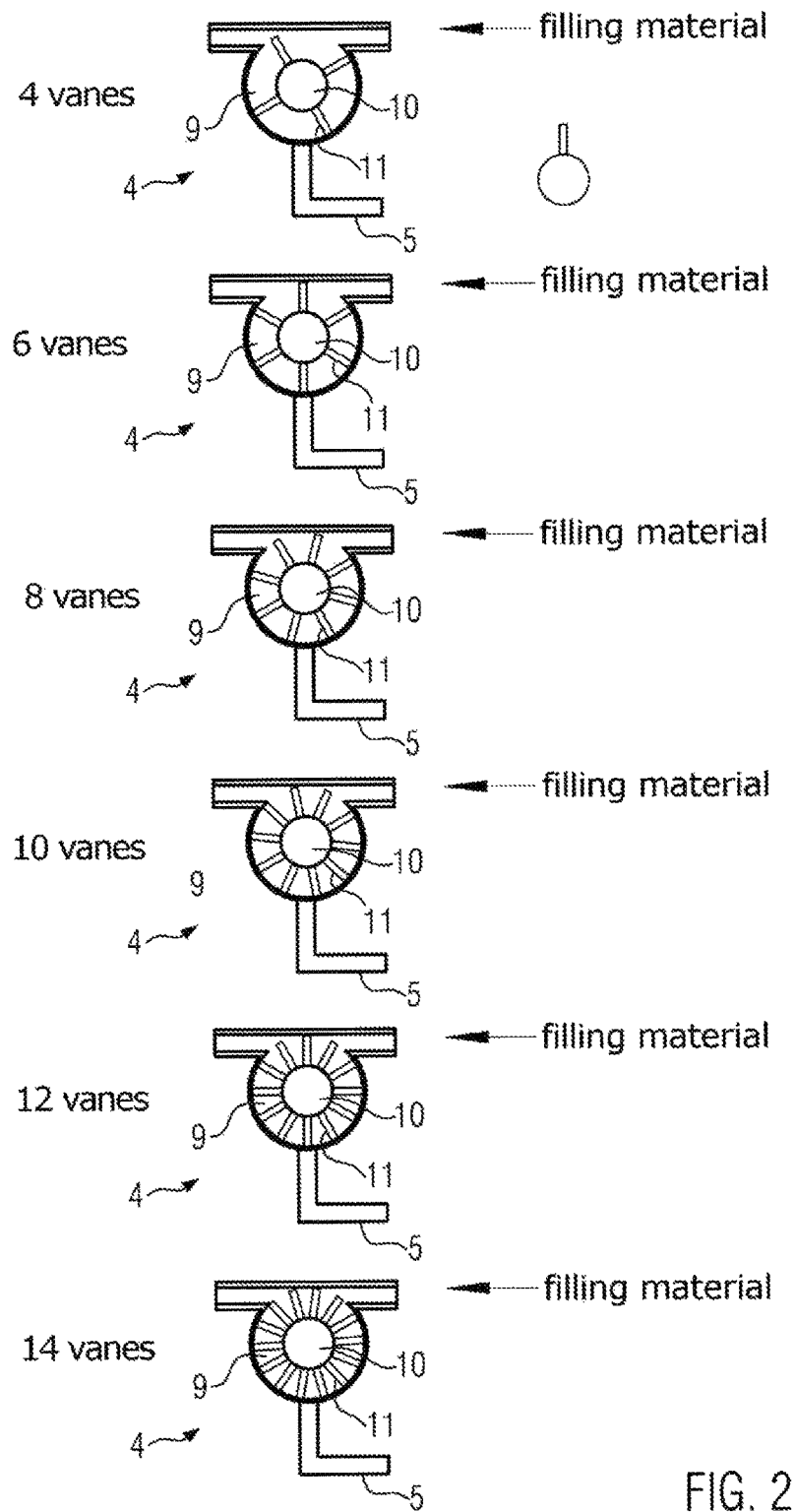
FIG. 2 very schematically shows a cross-section through several different embodiments of a dosing pump according to the present disclosure.

However, the volume of vane chambers 9 can not only be changed by appropriate spacer elements. Dosing pump 4 can preferably be configured such that the pump can be quickly adapted to the respective requirements e.g. by exchanging rotor 10 and pump vane 11. FIG. 2 shows dosing pump 4 with a respectively different number of vanes, such that also the vane chamber volume changes accordingly.

Rotor 10 is in these embodiments formed centrally and the vane chambers preferably have the same size when viewing a revolution of 360°. The pressure on the suction side $p_1$ is there to be substantially the pressure $p_2$ on the pressure side, i.e. substantially the same pressure is to prevail upstream of dosing pump 4 as downstream of the dosing pump, where a tolerance range from $|\Delta p|=|p_1-p_2|=0$ to 5 bar is sufficient.

Dosing pump 4 is in any event formed to be much smaller than delivery pump 2, such that the swallowing capacity of the dosing pump is substantially smaller than the swallowing capacity of delivery pump 2. The diameter of pump housing 22 is typically in a range from 100 to 200 mm. Height h of dosing pump 4 is, for example, in a range from 30 to 150 mm. The pasty mass entering dosing pump 4 via end region 20 is in vane chambers 9 by rotation of rotor 10 conveyed to end region 21, i.e. the outlet of the dosing pump. Rotor 10 is not driven by an integrated drive but by the transmission that is in the figures denoted with 5 and is with coupling 19, for example, e.g. a claw coupling, coupled to filling machine housing 17 such that dosing pump 4 can be driven by drive 7. Drive 7 is like drive 3, for example, an electric drive motor. Transmission train 5 can therefore in a simple manner with coupling 19 be coupled to machine housing 17 and a coupling at housing 22 of the dosing pump.

Second drive 7 is an existing drive which can also be used for other auxiliary devices, such as an inline grinder, a twist-off unit, a clipper, a length measuring unit etc. Filling machine 1 can comprise a device for detecting whether dosing pump 4 is installed. For this purpose, for example, a sensor—not illustrated—can be provided which responds when dosage pump 4 is installed and sends a corresponding signal to controller 8 of the filling machine. An input device can also in place of the device for detecting whether the dosing pump is attached be provided via which an operator enters that the dosing pump is attached or is to be driven by the second drive, respectively. The respective signals are then passed to controller 8. The information to the controller as to which auxiliary device is to be driven by the second drive can also be stored in a product memory for the different kinds of products to be produced and be retrieved by the controller.

Controller 8 can then actuate drive 7 according to a specific program and according to specific parameters. When it is by the device detected that no dosing pump 4 is installed, then controller 8 does not drive drive 7 or drives it for the use of a different auxiliary device. Controller 8 controls both drive 3 as well as drive 7, and can therefore coordinate the functions of the two drives with each other. The two drives 3, 7 are actuated such that the pressure difference $\Delta p$ between outlet 6 of the delivery pump and the outlet of dosing pump 4 is ≤5 bar. For this purpose, first pressure sensor 14 can be provided to measure pressure $p_1$ prevailing in outlet 6 of dosing pump 2 or upstream of dosing pump 4, respectively, and pressure sensor 15 which is arranged downstream of dosing pump 4. Respective measured values are then passed to controller 8 which then can actuate the drives such that e.g. $|p_1-p_2|=0$ to 5 bar.

Sensor 14 must not necessarily be located at dosing pump 4, but can also be arranged upstream of outlet end 6a.

If pressure sensors 14 and 15 are disposed directly on dosing pump 4, then the dosing pump also serves as a measuring cell.

Volumetric flow rates due to high pressure differences $\Delta p$ can thereby be prevented. The dosing pump is sized such that it withstands feed pressure $p_1$ under all circumstances, e.g. even with the absence of counter pressure in the dosing pump (when starting the process, complete discharge, etc.).

Delivery pump 2 is preferably pressure-regulated. This means, for example, that pressure $p_1$ at the outlet of the delivery pump is regulated to a certain nominal value $p_{1,Soll}$. The actuator there is drive 3 which is driven with a respective torque.

It is also possible, however, to regulate the volumetric flow rate or the volume delivered per unit time $$\frac{\Delta v}{\Delta t}$$

or a respective proportional value. Position control can be performed for a respective regulation in which the position of the vanes is controlled as a function of time. If a vane is at a particular time not in a particular location, then drive 3 is actuated accordingly by controller 8 such that a vane is at a particular time in a target position.

Pressure control for delivery pump 2 is particularly advantageous.

The dosing pump can also operate in a pressure-regulated manner such that pressure $p_2$ is regulated to a nominal value $p2=p2_{Soll}$. $P2_{Soll}$ is there in a range of $p_1 \pm \Delta p$, where $\Delta p$ is preferably 0 to 5 bar. Since $p_1$ is set or regulated to be constant, $p_2$ can be re-adjusted accordingly. However, the volumetric flow rate or a corresponding proportional value for dosing pump 4 is preferably regulated or position-controlled as described in connection with delivery pump 2. The temporal deviation from the nominal position of a vane is determined with position control as described above.

Connection region 21 of the dosing pump is configured such that dosing pump 4 can be connected to other auxiliary devices, for example, to a stuffing tube, a support device, a hanging line, etc. The dosing pump can therefore in a simple manner be integrated into an existing product flow. The dosing pump, due to standardized interfaces, fits to all standard filling machines.

In the method according to the disclosure, a dosing pump is first used, the vane chamber volume of which was adapted to the respective requirements, for example, by changing the total number of vane chambers or by inserting or removing spacer elements or spacer rings.

In one possible embodiment, a device then detects whether a dosing pump is connected and sends a corresponding signal to machine controller 8.

Pasty mass is fed from hopper 18 to delivery pump 2, which is actuated by controller 8 following a specific program, and delivers pasty mass in the delivery direction F to outlet 6 of delivery pump 2. Delivery pump 2 is operated at a specific capacity and in particular pressure-controlled, as described above, such that $p_1$ is in a predetermined nominal range. Disposed at end 6a of outlet 6 is dosing pump 4. The pasty mass is then further conveyed by dosing pump 4 through vane chambers 9 in the delivery direction F toward the outlet of dosing pump 4. The controller controls drives 3 and 7 such that $|p_1-p_2|=|\Delta p|=0$-5 bar. Pressure $p_1$ and $p_2$ can for this purpose be measured, for example, by sensors 14 and 15 and passed on to controller 8. It is advantageous if the dosing pump 4 is volume-controlled or position-controlled such that a predetermined volume per time can be discharged from dosing pump 4. Since the vane chambers of the dosing pump are much smaller than the vane chambers of delivery pump 2 and due to the fact that the differential pressure between $p_1$ and $p_2$ is much smaller than the differential pressure between the suction and the pressure side of dosing pump 2, the volume accuracy and thereby the portion accuracy of the portions to be produced can be increased substantially. This means that $|p_0-p_1|>|p_1-p_2|$ is true, where $p_0$ is the pressure on the suction side of delivery pump 2, $p_1$ is the pressure at the outlet of the delivery pump upstream of dosing pump 4, and pressure $p_2$ is the pressure at the outlet of dosing pump 4. Formed at end region 21 of dosing pump 4 is then, for example, a stuffing tube. The stuffing tube can also be integrally connected to the dosing pump. The pasty mass can then, for example, be discharged into a sausage casing. The filled sausage casing can be divided into individual portions, for example, by a partition element, which engages in the filled sausage casing and displaced the pasty mass, and possibly also be separated Very precise weight accuracy can be obtained since the volumetric flow rate of the dosing pump is constant, the pressure difference $\Delta p = p_1 - p_2$ is very small, and the vane chambers have less volume.

The invention claimed is:

1. A filling machine for filling a pasty mass, comprising:
   a delivery pump for conveying the pasty mass with a first drive,
   a dosing pump coupled to an outlet of said delivery pump, said dosing pump being configured as an exchangeable component, and on an inlet side and an outlet side thereof, comprises connection regions via which said dosing pump can, on the inlet side, be connected to the outlet end of said delivery pump, and on the outlet side be connected with accessories and/or auxiliary devices, and
   a drive train via which said dosing pump is coupled to a second drive integrated into said filling machine.

2. The filling machine according to claim 1, and a device for detecting whether a dosing pump is coupled and/or is to be driven by said second drive, said device comprising one of
   a sensor which detects whether said dosing pump is installed, a manual input device,
   a product memory in which it is stored for different products to be produced whether said dosing pump is to be driven by said second drive, where this information can be passed to a machine controller, and
   a combination thereof.

3. The filling machine according to claim 1, and a machine controller which actuates said first drive or said first and second drives.

4. The filling machine according to claim 1, and said second drive is a drive which can be actuated by said machine controller for the use of auxiliary devices.

5. The device according to claim 4, and the auxiliary devices comprise an inline grinder, a twist-off unit, a clipper, and a length measuring unit.

6. The filling machine according to claim 1, and said delivery pump and said dosing pump are configured as rotary vane conveying units, the size of said dosing pump being smaller than the size of said rotary vane pump.

7. The filling machine according to claim 6, and the volume that can be delivered by said dosing pump for every revolution is smaller than the respective volume of said delivery pump.

8. The filling machine according to claim 1, and said dosing pump is configured such that the number of vane chambers and/or the volume of said vane chambers is variable.

9. The filling machine according to claim 8, and a rotor and/or the pump vanes are arranged to be exchangeable and/or spacer elements can be employed that reduce the volume of said vane chambers.

10. The filling machine according to claim 1, said first and second drives can be actuated such that a difference $|\Delta p|$ between a first pressure $p_1$ upstream of said dosing pump and a pressure $p_2$ downstream of said dosing pump is in a defined range of $|\Delta p|=0$ to 5 bar, and a first pressure sensor being arranged in the conveying direction upstream of said dosing pump and a second pressure sensor being arranged in the conveying direction downstream of said dosing pump, the measured values being passed to said machine controller and said machine controller actuates said drives such that said pressure difference $|\Delta p|$ between the pressures measured by said first and said second pressure sensors is within said defined range.

11. The filling machine according to claim 1, and said dosing pump is arranged outside the filling machine housing and said second drive within said filling machine housing and a coupling is arranged on said filling machine housing for coupling said transmission or drive train, respectively, to said second drive.

12. The filling machine according to claim 1, and the pasty mass comprises sausage material.

13. The filling machine according to claim 1, wherein said accessories and/or auxiliary devices comprise a stuffing tube, a support device, and a hanging line.

* * * * *